United States Patent
Izawa

(10) Patent No.: US 9,122,115 B2
(45) Date of Patent: Sep. 1, 2015

(54) ELECTRO-OPTIC DEVICE AND ELECTRONIC APPARATUS

(71) Applicant: Seiko Epson Corporation, Tokyo (JP)

(72) Inventor: Shotaro Izawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/048,422

(22) Filed: Oct. 8, 2013

(65) Prior Publication Data

US 2014/0118674 A1    May 1, 2014

(30) Foreign Application Priority Data

Oct. 31, 2012    (JP) .................................. 2012-240000

(51) Int. Cl.
*G02F 1/136*    (2006.01)
*G02F 1/1333*    (2006.01)
*G02F 1/1362*    (2006.01)
*G02F 1/1335*    (2006.01)

(52) U.S. Cl.
CPC .... *G02F 1/136227* (2013.01); *G02F 1/133553* (2013.01); *G02F 1/133345* (2013.01)

(58) Field of Classification Search
CPC .................................................. G02F 1/136227
See application file for complete search history.

(56) References Cited

U.S. PATENT DOCUMENTS

| 5,990,555 A | 11/1999 | Ohori et al. |
| 6,573,954 B1 * | 6/2003 | Hirose et al. .................... 349/43 |
| 7,283,182 B2 | 10/2007 | Sato |
| 2011/0194060 A1 | 8/2011 | Jiroku |

FOREIGN PATENT DOCUMENTS

| JP | 09-306990 A | 11/1997 |
| JP | 2002-124516 A | 4/2002 |
| JP | 2003-031649 A | 1/2003 |
| JP | 2004-186590 A | 7/2004 |
| JP | 2005-222019 A | 8/2005 |
| JP | 2007-192975 A | 8/2007 |
| JP | 2009-080387 A | 4/2009 |
| JP | 2011-164249 A | 8/2011 |
| JP | 2012-103386 A | 5/2012 |

* cited by examiner

*Primary Examiner* — Wen-Ying P Chen
(74) *Attorney, Agent, or Firm* — ALG Intellectual Property, LLC

(57) ABSTRACT

Disclosed an electro-optic device which includes a reflective pixel electrode which is formed on a base of a contact hole in an approximately rectangular shape or an approximately oval shape, and a side wall thereof, and a second insulating film which covers the reflective pixel electrode, and has a cavity in the contact hole, in which the film thickness of the reflective pixel electrode becomes large toward the upper part from the base of the contact hole.

4 Claims, 9 Drawing Sheets

FIG. 7A
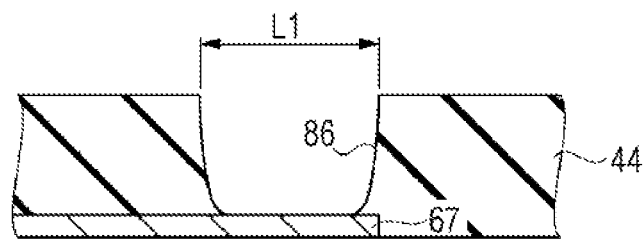
FIG. 7B
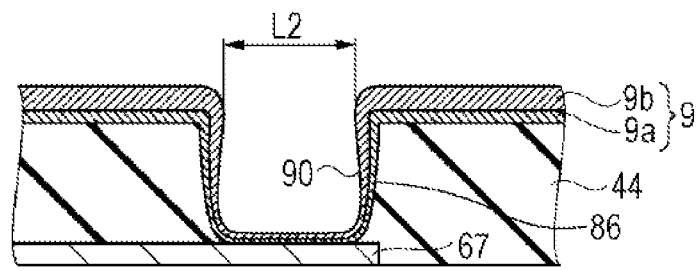
FIG. 7C
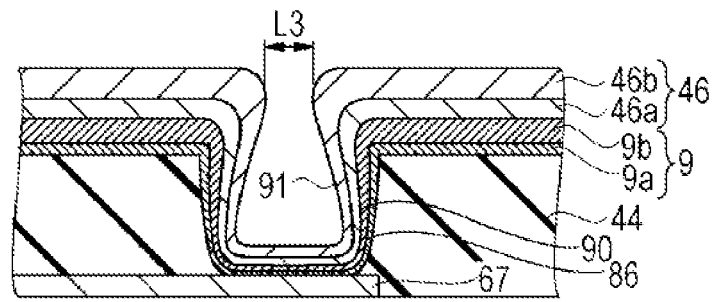
FIG. 7D
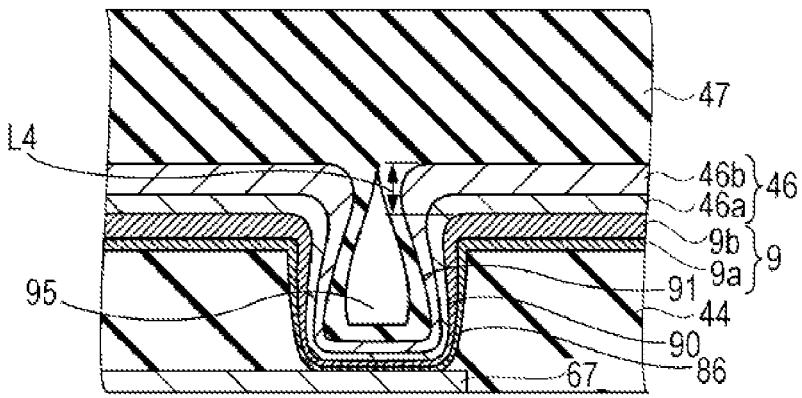
FIG. 7E
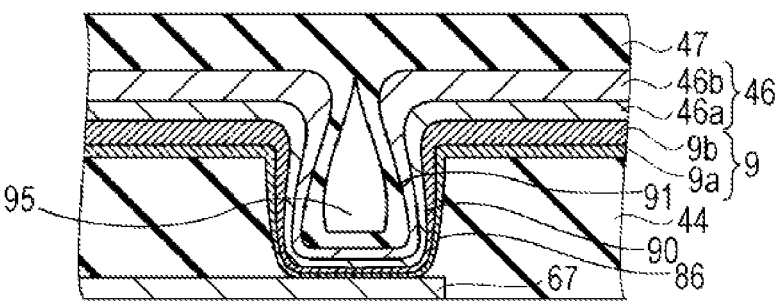
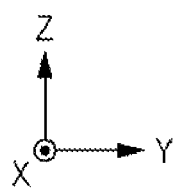

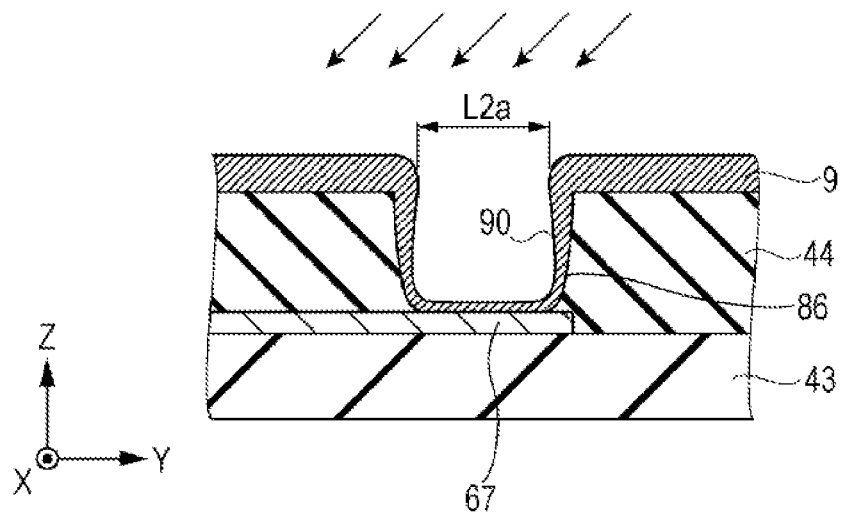
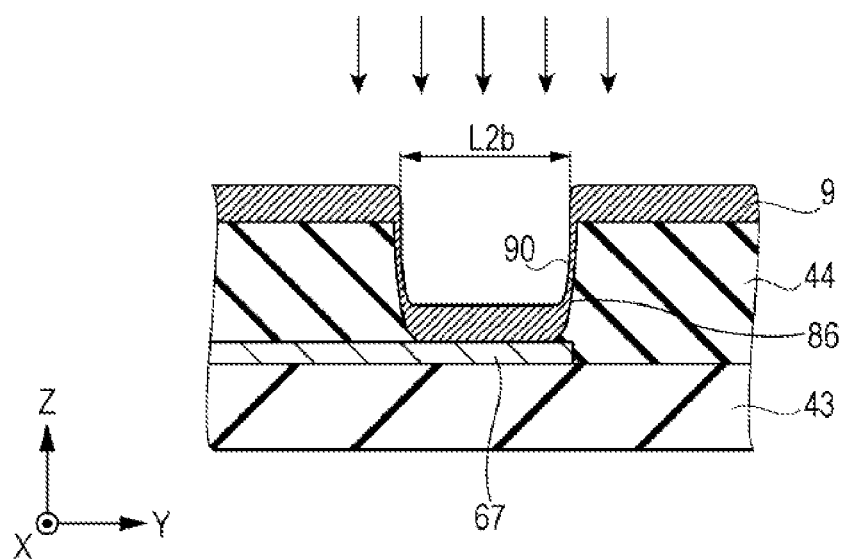

ELECTRO-OPTIC DEVICE AND ELECTRONIC APPARATUS

BACKGROUND

1. Technical Field

The present invention relates to an electro-optic device, a method of manufacturing the electro-optic device, and an electronic apparatus on which the electro-optic device is mounted.

2. Related Art

A liquid crystal device as an example of an electro-optic device has a structure in which liquid crystal is interposed between a pair of substrates and in which one substrate between the pair of substrates is an element substrate including a Thin Film Transistor (hereinafter, briefly referred to as TFT) or a pixel electrode and the other substrate is a counter substrate which includes a common electrode with translucency.

For example, a TFT, an interlayer insulating film, an electrode pixel, an insulating film, and an alignment film are laminated in this order on an element substrate of a liquid crystal device which is disclosed in JP-A-2011-164249. The TFT and the pixel electrode are connected through a contact hole which is formed on the interlayer insulating film. A concave portion which is generated in the pixel electrode due to the contact hole is covered with the insulating film. The insulating film is formed so as to have an enclosed cavity at a position corresponding to the concave portion. In addition, a surface which comes into contact with the alignment film becomes planar when the insulating film is performed with a polishing process (planarizing process), and irregular aligning due to an irregularity is suppressed.

In the liquid crystal device which is disclosed in JP-A-2011-164249, it is necessary to make a film thickness of the insulating film which is arranged between the pixel electrode and the alignment film small after polishing since an effective voltage which is applied to a liquid crystal between the pixel electrode and the common electrode is decreased, however, there has been a limit to thinning the film thickness using a polishing process. Specifically, when the insulating film becomes excessively thin using the polishing process, the cavity is exposed, and alignment of the liquid crystal is disturbed in a region in which the cavity is exposed, therefore there has been a limit of thinning the film thickness using the polishing process. That is, it is necessary to make the cavity of the insulating film which is formed at a position corresponding to the concave portion smaller, in order to make the insulating film thinner.

SUMMARY

The invention can be realized in the following forms or application examples.

Application Example 1

An electro-optic device according to this application example includes: a pixel switching element; a first insulating film which is arranged at an upper part of the pixel switching element and is formed with a contact hole; a pixel electrode which covers a part of a surface of the first insulating film, and a base and a side wall of the contact hole, includes a concave portion at a position corresponding to the contact hole, is electrically connected to the pixel switching element, and includes reflectivity; and a second insulating film which covers the pixel electrode, and includes a cavity at least part of which thereof is located inside the concave portion, in which a planar shape of the contact hole is either an approximately rectangular shape or an approximately oval shape, and a film thickness of the pixel electrode which covers the side wall of the contact hole and becomes large toward the surface of the first insulating film from the base of the contact hole.

The planar shape of the contact hole which is formed on the first insulating film is approximately rectangular or approximately oval and has a longitudinal (long side) direction and a lateral (short side) direction. The contact hole is covered with the pixel electrode, and a concave portion having the same planar shape as the contact hole is formed at a position corresponding to the contact hole. Accordingly, the concave portion has an opening area which becomes small in the lateral direction.

Since the film thickness of the pixel electrode becomes large toward the surface of the first insulating film (apex of contact hole) from the base of the contact hole (base portion of contact hole), an overhang (thick film area) in which the film thickness of the pixel electrode becomes large is formed at an apex of the concave portion. The opening area which becomes small in the lateral direction becomes smaller due to the thick film area, and an opening portion of the apex of the concave portion can be easily covered (enclosed) with the second insulating film. That is, it is possible to enclose the opening area easily and in a short time by depositing the second insulating film with small film thickness. In addition, since the concave portion has a shape which is tapered at the apex portion, the concave portion is enclosed by the second insulating film, and a cavity at least a part of which is located inside the concave portion is formed. Since the concave portion is enclosed when the second insulating film with small film thickness is deposited, it is possible to make the cavity which is formed in the second insulating film small and to make a position of the apex of the cavity low compared to those in JP-A-2011-164249.

The second insulating film is performed with a planarizing process (film reducing process) to an extent that the cavity is not exposed, and the second insulating film on the pixel electrode is thinned. It is possible to make the second insulating film on the pixel electrode thin compared to that in JP-A-2011-164249 by making the position of the apex of the cavity low. As a result, a deterioration in a display signal (decrease in effective voltage) which is supplied from the pixel electrode is reduced, and accordingly, it is possible to provide a high quality display.

Application Example 2

The electro-optic device according to the application example may further include a dielectric multilayer film which covers a surface of the pixel electrode, and a base and a side wall of the concave portion of the pixel electrode between the pixel electrode and the second insulating film, in which a film thickness of the dielectric multilayer film which covers the side wall of the concave portion may become large toward the surface of the pixel electrode from the base of the concave portion.

By covering the concave portion of the pixel electrode with the dielectric multilayered film which becomes thick in the direction that goes toward the surface of the pixel electrode (apex of concave portion) from the base of the concave portion (base portion of concave portion), an overhang of the dielectric multilayered film (thick film area) is formed at the apex of the concave portion, the narrowed opening area of the concave portion becomes narrower, and becomes easy to be enclosed by the second insulating film. That is, since it is possible to enclose the concave portion more easily and in a shorter time by depositing the second insulating film with smaller film thickness, the cavity which is formed in the second insulating film can be made smaller, and the position of the apex of the cavity can be made lower.

Application Example 3

An electronic apparatus according to this application example includes the electro-optic device which is disclosed in the above described application example.

Since the electronic apparatus according to the application example includes a display device which is disclosed in the above described application example, it is possible to realize various electronic apparatuses with a function of a high quality display, for example, a projector, a direct viewing-type television, a mobile phone, a mobile audio system, a personal computer, a monitor of a video camera, a car navigation device, an electronic organizer, a calculator, a work station, a television phone, a point-of-sale (POS) terminal, and a digital still camera.

Application Example 4

A method of manufacturing an electro-optic device according to this application example in which a first insulating film including a contact hole, a reflective pixel electrode which covers a part of a surface of the first insulating film, and a base and a side wall of the contact hole, and a second insulating film are laminated in this order on an upper part of a pixel switching element, and includes forming a contact hole including a planar shape of either an approximately rectangular shape or an approximately oval shape on the first insulating film; forming a conductive film which is reflective so that a film thickness becomes large toward the surface of the first insulating film from the base of the contact hole, and forming the pixel electrode by patterning the conductive film; forming the second insulating film so that the pixel electrode is covered and a cavity is formed at a portion corresponding to the contact hole; and performing a planarizing process with respect to the second insulating film so that the cavity is not exposed.

In the method of manufacturing the electro-optic device according to the application example, the contact hole which is formed on the first insulating film is made in a planar shape of approximately rectangular or approximately oval figure, that is, a planar shape having a longitudinal (long side) direction and a lateral (short side) direction. In addition, the contact hole is covered with a conductive film (pixel electrode) which is reflective, and a concave portion is formed at a portion corresponding to the contact hole. The concave portion has a planar shape which is the same as the contact hole and has an opening area which becomes narrow in the lateral direction. Since the film thickness of the pixel electrode becomes large toward the surface of the first insulating film from the base of the contact hole, an overhang (thick film area) in which the film thickness of the pixel electrode becomes thick is formed at the apex of the concave portion. The opening area which becomes narrow in the lateral direction becomes narrower by the thick film area, and accordingly, it is possible to cover (enclose) the opening area at the apex of the concave portion by the second insulating film easily. That is, it is possible to easily enclose the opening area, and in a short time by depositing the second insulating film with small film thickness. In addition, since the concave portion has a tapered shape in the apex, is enclosed by the second insulating film, and at least a part thereof is formed with a cavity which is located inside the concave portion. Since the concave portion is enclosed by depositing the second insulating film with the small film thickness, it is possible to make the cavity which is formed in the second insulating film small and to make a position of the apex of the cavity low compared to those in JP-A-2011-164249. Since the position of the apex of the cavity becomes low, it is possible to make the film thickness of the second insulating film which is formed by being performed with a planarizing process to an extent that the cavity is not exposed small. That is, since the second insulating film which is formed on the pixel electrode can be made thin compared to that in JP-A-2011-164249, it is possible to reduce a deterioration in a display signal (decrease in effective voltage) which is applied from the pixel electrode and to provide a high quality display.

Application Example 5

In the method of manufacturing the electro-optic device according to the application example, the performing of the planarizing process with respect to the second insulating film may include polishing, and etching of a polished surface after the polishing.

Since the method of manufacturing the electro-optic device according to the application example includes the polishing and the etching of the polished surface, it is possible to reduce minute scratches on the polished surface which occur in the polishing using etching. That is, it is possible to make the polished surface of the second insulating film a further planar surface.

BRIEF DESCRIPTION OF THE DRAWINGS

The invention will be described with reference to the accompanying drawings, wherein like numbers reference like elements.

FIGS. 7A to 7E are schematic cross-sectional views in each process flow which illustrates a state of the pixel contact area.

FIGS. 8A and 8B are diagrams which illustrate a relationship between an input direction of deposits and a deposited state of the deposits. FIG. 8A is a diagram which illustrates a deposited state when being input in the oblique direction, and FIG. 8B is a diagram which illustrates a deposited state when being input from the right above.

DESCRIPTION OF EXEMPLARY EMBODIMENTS

Hereinafter, embodiments of the present invention will be described with reference to drawings. The embodiment describes one exemplary embodiment, does not limit the invention, and can be arbitrarily modified in a range of a technical idea of the invention. In addition, in each figure below, since each layer or each portion is set to a size which is recognizable in drawings, a scale of each layer or each portion is set to be different from an actual scale.

EMBODIMENT

Schematic Description of Electro-Optic Device

A liquid crystal device 100 as an example of an electro-optic device according to the embodiment is a reflection type liquid crystal device which includes a thin film transistor (hereinafter, referred to as TFT) 30 as an example of a pixel switching element. The liquid crystal device 100 can be preferably used, for example, as a reflection type optical modulation device of a liquid crystal projector which will be described later.

First, the entire configuration of the liquid crystal device 100 according to the embodiment will be described with reference to FIGS. 1A, 1B, and 2.

Figure 1A:
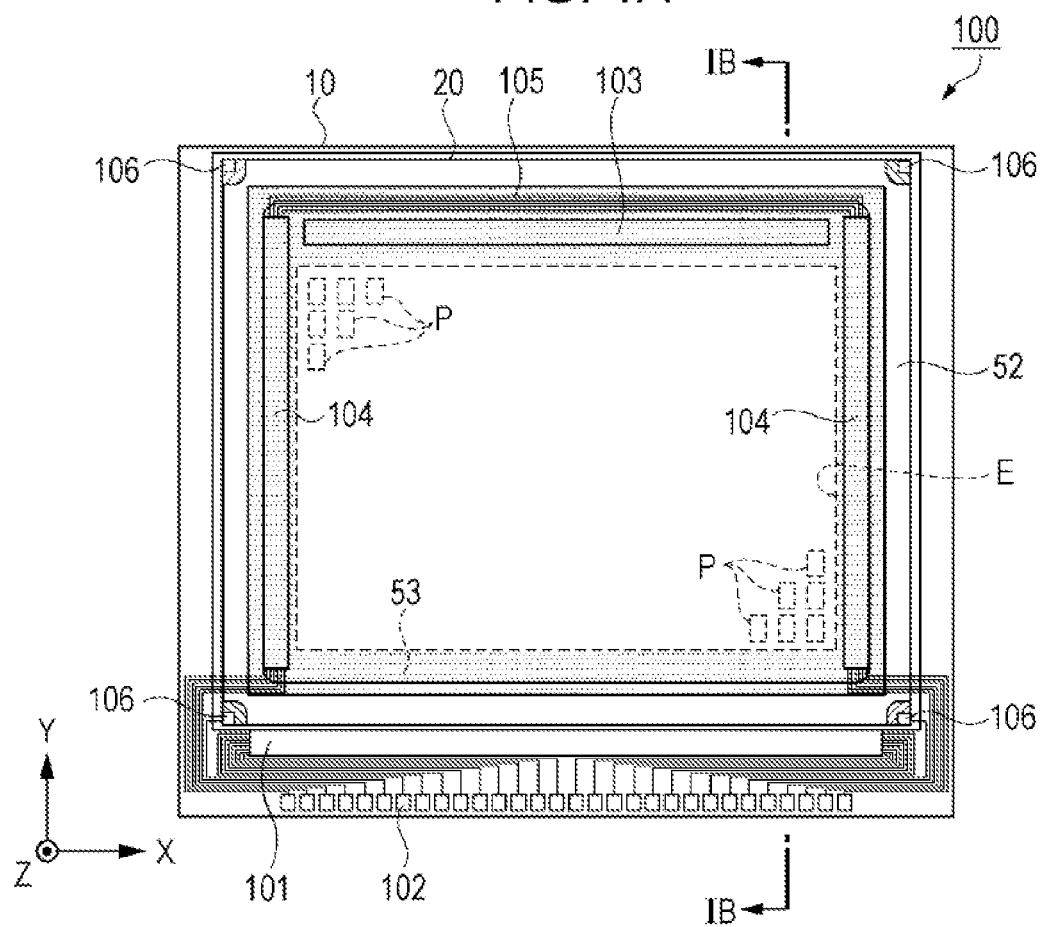
FIG. 1A is a schematic plan view which illustrates a configuration of a liquid crystal device.
Figure 1B:
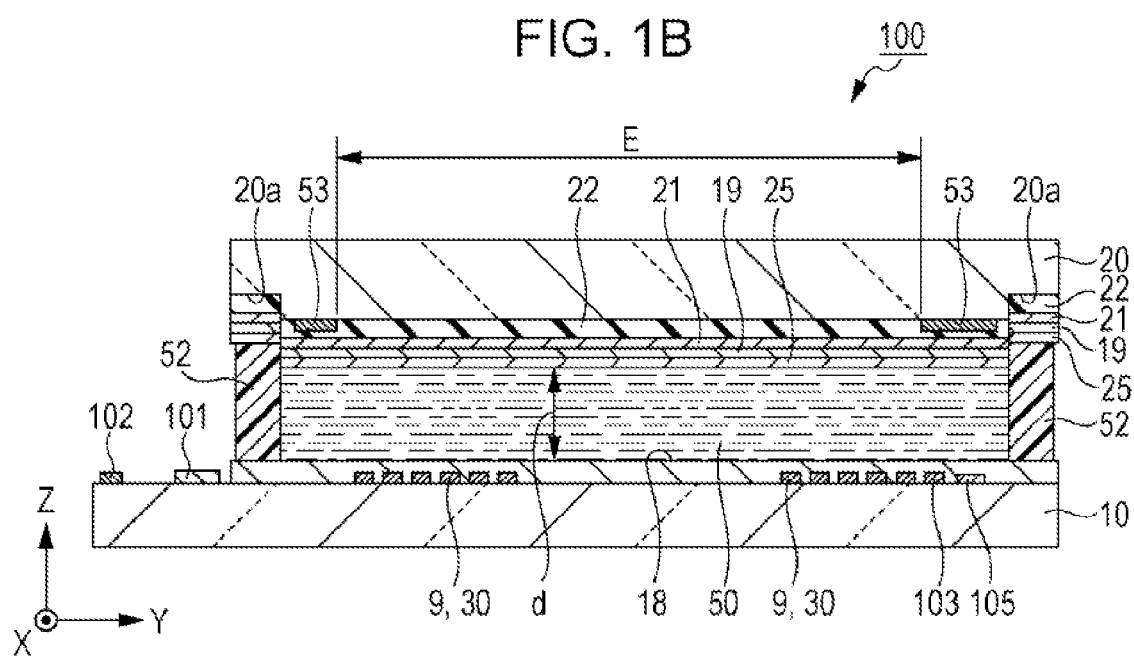
FIG. 1B is a schematic cross-sectional view which is cut along line IB-IB.
Figure 2:
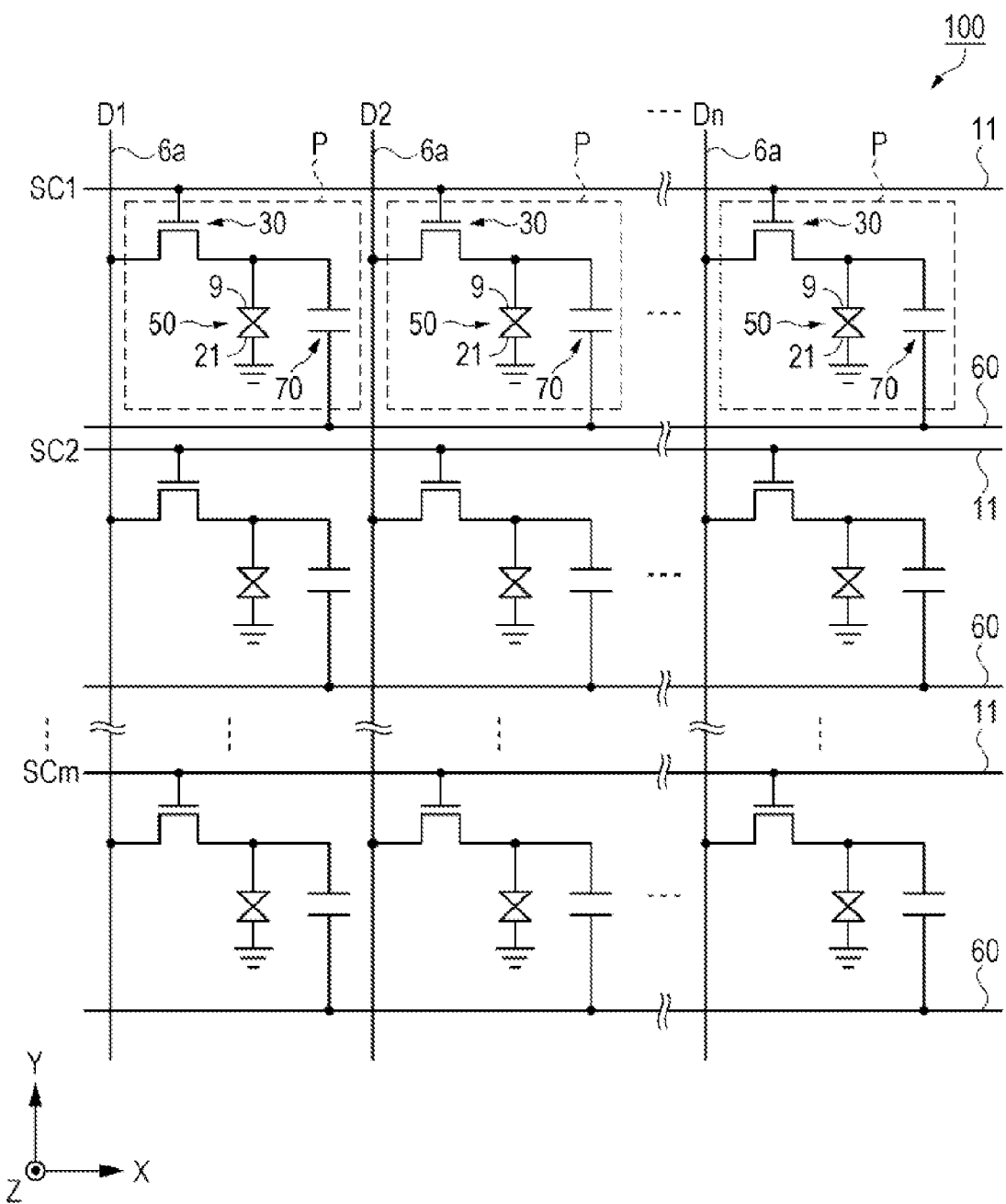
FIG. 2 is an equivalent circuit diagram which illustrates an electrical configuration of the liquid crystal device.

FIG. 1A is a schematic plan view which illustrates a configuration of the liquid crystal device, FIG. 1B is a schematic cross-sectional view of the liquid crystal device which is cut along IB-IB in FIG. 1A, and FIG. 2 is an equivalent circuit diagram which illustrates an electrical configuration of the liquid crystal device.

As illustrated in FIGS. 1A and 1B, the liquid crystal device 100 according to the embodiment includes an element substrate 10 and a counter substrate 20 which are arranged so as to face each other, a liquid crystal layer 50 which is interposed between the pair of substrates, and the like.

The element substrate 10 is configured by, for example, a transparent quartz substrate, a glass substrate, an opaque silicon substrate, or the like, and is larger than the counter substrate 20. In addition, the element substrate 10 is bonded to the counter substrate 20 through a sealing material 52 which is arranged along the outer periphery of the counter substrate 20 without a break. Liquid crystals having negative dielectric anisotropy are enclosed in an area which is surrounded with the sealing material 52 and a liquid crystal layer 50 is configured.

When enclosing (filling up) the liquid crystal between the pair of substrates according to the embodiment, a One Drop Fill (ODF) method in which the sealing material 52 is arranged along the outer periphery of one substrate between the pair of substrates, liquid crystals of a predetermined amount are dropped inside the sealing material 52, and the one substrate on which the liquid crystal is dropped and the other substrate are bonded under reduced pressure is adopted.

In the sealing material 52, an adhesive, for example, such as a heat curable or a ultraviolet ray curable epoxy resin is used. The sealing material 52 includes a spacer (not shown) for maintaining a constant gap between the pair of substrates.

A parting unit 53 which is arranged so as to surround a pixel region E is provided inside the sealing material 52.

A plurality of pixels P arranged in a matrix in the pixel region E. The pixel region E may include a plurality of dummy pixels which are arranged so as to surround a plurality of effective pixels P which contribute to a display.

A data line driving circuit 101 is provided between the sealing material 52 which goes along one side portion of the element substrate 10 and the one side portion. In addition, an inspection circuit 103 is provided between the sealing material 52 which goes along another one side portion facing the one side portion and the pixel region E. In addition, a scanning line driving circuit 104 is provided between the sealing material 52 which goes along other two side portions which are orthogonal to the one side portion and face each other and the pixel region E. A plurality of wirings 105 which connect two scanning line driving circuits 104 are provided between the sealing material 52 which goes along another one side portion facing the one side portion and the pixel region E. This data line driving circuit 101 and the wiring 105 which is connected to the scanning line driving circuit 104 are connected to a plurality of external connection terminals 102 which are arranged along the one side portion.

Hereinafter, descriptions will be made by setting a direction which goes along the one side portion to the X direction, a direction which goes along other two side portions which are orthogonal to the one side portion, and face each other to the Y direction, and a direction which is orthogonal to the X direction and the Y direction, and goes toward the counter substrate 20 from the element substrate 10 to the Z direction.

As illustrated in FIG. 1B, on the surface of the element substrate 10 on the liquid crystal layer 50 side, a pixel electrode 9 having reflectivity which is provided in each pixel P, the TFT 30, an alignment film 18 which covers the plurality of pixel electrodes 9, and the like are formed. In addition, the TFT 30 is an example of a "pixel switching element" according to the embodiment of the invention. Detailed descriptions of the pixel P will be made later.

The counter substrate 20 is configured of a transparent material, for example, such as a quartz substrate, a glass substrate, or the like, and on the surface on the liquid crystal layer 50 side, a parting unit 53, a planarization layer 22 which covers the paring unit 53, a counter electrode 21 which is provided along the pixel region E, a dielectric layer 19 which covers the counter electrode 21, an alignment film 25, and the like are formed.

The parting unit 53 is formed of, for example, light blocking metal, metal oxide, or the like, and as illustrated in FIG. 1A, the unit is provided at a position which is overlapped with the scanning line driving circuit 104 and the inspection circuit 103 when planarly viewed. In this manner, light which is input from the counter substrate 20 side is shielded, and the unit takes a role of preventing false operations of these driving circuits. In addition, the unit shields unnecessary stray light so as not to be input to the pixel region E and secures a high contrast in a display of the pixel region E.

The planarization layer 22 can be formed by performing, for example, a normal pressure CVD method or a low pressure CVD method with respect to silicon oxide as a translucent inorganic insulating material. The planarization layer has a film thickness in which irregularity on the surface which occurs due to the parting unit 53 formed on the counter substrate 20 can be relieved.

The counter electrode 21 is configured of a transparent material such as Indium Tin Oxide (ITO) or the like. The counter electrode 21 is electrically connected to routing wiring on the element substrate 10 side by a vertical conduction unit 106 which is provided at four corners of the counter substrate 20.

The dielectric layer 19 is formed of, for example, a silicon oxide film or the like and takes a role of making a work function on the pixel electrode 9 side and a work function on the counter electrode 21 side be the same degree. In addition, the dielectric layer 19 may be configured of a plurality of dielectric films.

The alignment film 18 on the element substrate 10 side and the alignment film 25 on the counter substrate 20 side are set based on an optical design of the liquid crystal device 100, and according to the embodiment, the films are configured by an oblique vapor deposition film (inorganic alignment film) of an inorganic material such as silicon oxide. A liquid crystal having negative dielectric anisotropy is approximately vertically aligned with a pre-tilt in a predetermined direction with respect to a surface of the alignment film. In addition, in the alignment films 18 and 25, an organic alignment film such as polyimide may be used.

The counter substrate 20 has a concave portion 20a which is formed at a portion which is planarly overlapped with the sealing material 52. The concave portion 20a is formed from the outer side of the parting unit 53 of the counter substrate 20 to the outer periphery of the substrate. The planarization layer 22, the counter electrode 21, the dielectric layer 19, and the alignment film 25 are also formed in the concave portion 20a, respectively. When setting the thickness of the liquid crystal layer 50 at the time of arranging the element substrate 10 and the counter substrate 20 so as to face each other by interposing the liquid crystal layer 50 therebetween to thickness d, the sealing material 52 includes a spacer (not shown) with a larger diameter than the thickness d of the liquid crystal layer 50, in consideration of the depth of the concave portion 20a. According to such a cross-sectional structure of the counter substrate 20, since it is possible to arrange the element substrate 10 and the counter substrate 20 so as to face each other and to bond thereof using the sealing material 52 which includes the spacer with a larger diameter than the thickness d of the liquid crystal layer 50, the irregular thickness of the liquid crystal layer 50 can be suppressed.

As illustrated in FIG. 2, the liquid crystal device 100 includes a plurality of scanning lines 11 and a plurality of data lines 6a as signal lines which are insulated and orthogonal to each other at least in the pixel region E, and a capacitance line 60 which is parallel to the scanning line 11. In addition, arranging of the capacitance line 60 is not limited to this, and the capacity line may be arranged so as to be parallel to the data line 6a.

The pixel electrode 9, the TFT 30, and a storage capacitor 70 are provided at a region which is divided by the scanning line 11 and the data line 6a, and these configure a pixel circuit of the pixel P.

The scanning line 11 is electrically connected to a gate of the TFT 30, and the data line 6a is electrically connected to a source of the TFT 30. The pixel electrode 9 is electrically connected to a drain of the TFT 30.

The data line 6a is connected to the data line driving circuit 101 (refer to FIGS. 1A and 1B), and supplies image signals D1, D2, . . . , Dn which are supplied from the data line driving circuit 101 to the pixel P. The scanning line 11a is connected to the scanning line driving circuit 104 (refer to FIGS. 1A and 1B), and supplies scanning signals SC1, SC2, . . . , SCm which are supplied from the scanning line driving circuit 104 to each pixel P. The image signals D1 to Dn which are supplied from the data line driving circuit 101 to the data line 6a may be line-sequentially supplied in this order and may be supplied in each group with respect to the plurality of data lines 6a which are neighboring each other. The scanning line driving circuit 104 supplies the scanning signals SC1 to SCm to the scanning line 11 at a predetermined timing.

The liquid crystal device 100 has a configuration in which the image signals D1 to Dn supplied from the data line 6a are written in the pixel electrode 9 at a predetermined timing when the TFT 30 as the switching element is an ON state only for a certain period of time due to the input of the scanning signals SC1 to SCm. In addition, the image signals D1 to Dn of a predetermined level which are written in the liquid crystal layer 50 through the pixel electrode 9 are maintained between the pixel electrode 9 and the counter electrode 21 which functions as a common electrode which is opposingly arranged through the liquid crystal layer 50 for a certain period of time.

The storage capacitor 70 is connected in parallel to a liquid crystal capacitor which is formed between the pixel electrode 9 and the counter electrode 21 in order to prevent the maintained image signals D1 to Dn from leaking (deteriorating). The storage capacitor 70 is provided between the drain of the TFT 30 and the capacitance line 60.

In addition, the data line 6a is connected to the inspection circuit 103 which is illustrated in FIG. 1A, and the inspection circuit has a configuration in which faults or the like in the operation of the liquid crystal device 100 can be confirmed by detecting the image signal in the process of manufacturing the liquid crystal device 100, however, it is omitted in the equivalent circuit in FIG. 2.

Such a liquid crystal device 100 is a reflection type in which an optical design such as a normally black mode in which reflectivity becomes a minimum in a state of not being applied with a voltage or a normally white mode in which the reflectivity becomes a maximum in a state of not being applied with a voltage is adopted. According to the optical design, polarizing elements are arranged on the light input side (output side) and are used.

Configuration of Pixel

Subsequently, a detailed configuration of the pixel P which executes the above described operations will be described with reference to FIGS. 3 and 4.

Figure 3:
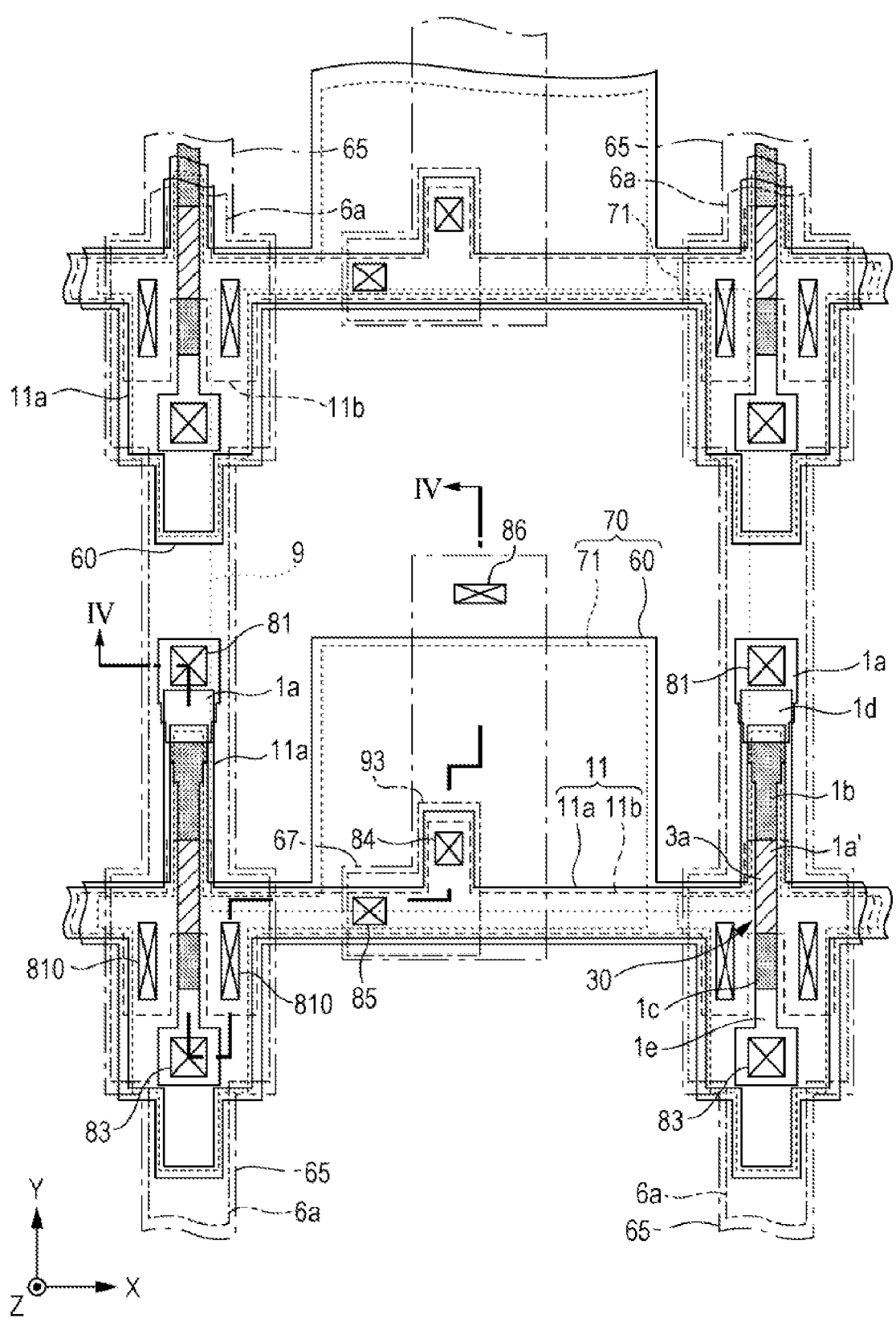
FIG. 3 is a schematic plan view of a plurality of pixels which are close to one another.
Figure 4:
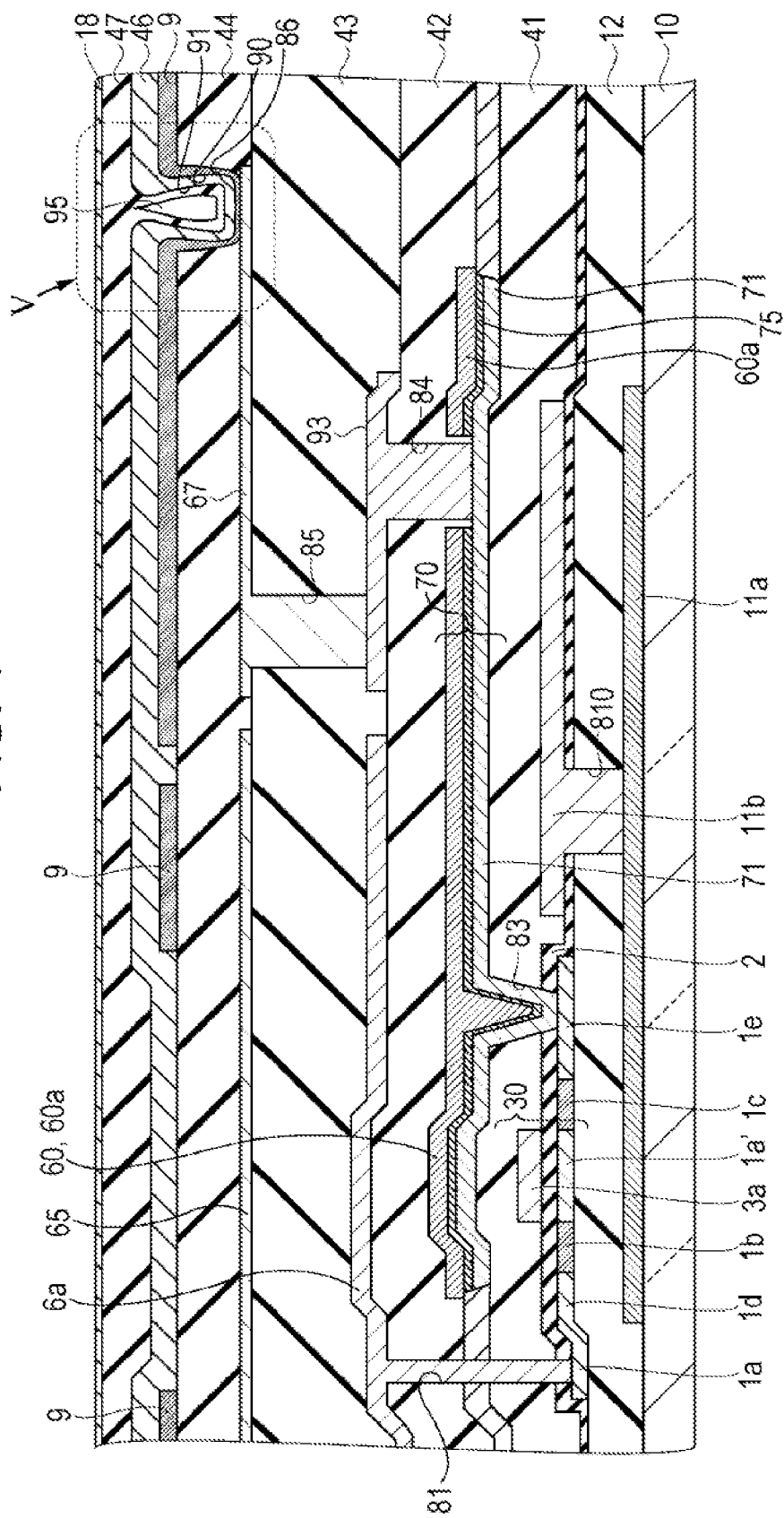
FIG. 4 is a schematic cross-sectional view which is cut along line IV-IV in FIG. 3.

FIG. 3 is a schematic plan view of a plurality of pixels which are closed to one another and FIG. 4 is a schematic cross-sectional view which is cut along line IV-IV in FIG. 3. In FIG. 3, portions located above the pixel electrode 9 are omitted in order to make descriptions convenient.

In FIG. 3, the plurality of pixel electrodes 9 are provided in a matrix on the element substrate 10. The data line 6a and the scanning line 11 are respectively provided along vertical and horizontal borders of the pixel electrode 9. That is, the scanning line 11 stretches along the X direction, and the data line 6a stretches along the Y direction so as to intersects the scanning line 11. In addition, the scanning line 11 includes a first scanning line 11a which also functions as a lower light shielding film, and a second scanning line 11b which is integrally formed with a gate electrode 3a (gate) is wired in double along the X direction. The TFT 30 for pixel switching is provided at each portion in which the scanning line 11 and the data line 6a cross each other. Since the first scanning line 11a and the second scanning line 11B are wired in double in this manner, it is possible to entirely lower an electrical resistance of the scanning line 11. In addition, even when a failure such as a disconnection, or the like, occurs in one of either the first scanning line 11a and the second scanning line 11B, it is possible to improve a reliability of the liquid crystal device 100, since it is possible to cause the other to function redundantly.

Hereinafter, a laminating structure of the pixel P which is provided on a base material of the element substrate 10 will be described in order from the first layer.

The first scanning line 11a with, for example, a film thickness of 200 nm is provided on the first layer using conductive polysilicon, high melting metal, high melting metal silicide, or the like. The first scanning line 11a has a portion which stretches along the X direction as illustrated in FIG. 3 and a portion which stretches along the Y direction so as to be overlapped with a channel region 1a' of the TFT 30 from the portion.

As illustrated in FIG. 3, the first scanning line 11a is formed so as to include a region facing the channel region 1a' of the TFT 30, an LDD region 1b on the data line side, an LDD region 1c on the pixel electrode side, a source-drain region 1d (source) on the data line side, and a source-drain region 1e (drain) on the pixel electrode side. The first scanning line 11a shields the channel region 1a' of the TFT 30 and is a light shielding film which is arranged on the lower side of the TFT 30.

In FIG. 4, the scanning line 11a on the first layer and the TFT 30 on the second layer are insulated by a base insulating film 12. The base insulating film 12 has a function of preventing a deterioration in characteristics of the TFT 30 for pixel switching due to roughness on the surface of the element substrate 10 at the time of polishing, a remaining stain after cleaning, or the like, by being formed on the entire surface of the element substrate 10 in addition to a function of insulating the TFT 30 from the first scanning line 11a. In addition, the base insulating film 12 has a two-layer structure which is formed, for example, by laminating a TEOS (ethyl silicate) film to a film thickness of 300 nm and a High Temperature Oxide (HTO) film to a film thickness of 50 nm.

A TFT 30 including a semiconductor film 1a and a gate electrode 3a is provided on the second layer.

As illustrated in FIGS. 3 and 4, the semiconductor film 1a is formed of, for example, polysilicon, with a film thickness of 55 nm, and is configured by the channel region 1a' with a channel length which goes along the Y direction, the LDD region 1b on the data line side, the LDD region 1c on the pixel electrode side, the source-drain region 1d on the data line side, and the source-drain region 1e on the pixel electrode side. That is, the TFT 30 has an LDD structure.

The source-drain region 1d on the data line side and the source-drain region 1e on the pixel electrode side are formed approximately in mirror symmetry along the Y direction by setting the channel region 1a' as a reference. The LDD region 1b on the data line side is formed between the channel region 1a' and the source-drain region 1d on the data line side using, for example, an ion plantation method. The LDD region 1c on the pixel electrode side is formed between the channel region 1a' and the source-drain region 1e on the pixel electrode side. The LDD region 1b on the data line side, the LDD region 1c on the pixel electrode side, the source-drain region 1d on the data line side, and the source-drain region 1e on the pixel electrode side are impurity regions which are formed by pushing impurities in the semiconductor film 1a. In addition, it is preferable for the TFT 30 to have the LDD structure, however, the structure may be an offset structure in which impurities are not pushed in the LDD region 1b on the data line side and the LDD region 1c on the pixel electrode side.

In FIGS. 3 and 4, the second scanning line 11b integrally formed with the gate electrode 3a, for example, by laminating conductive polysilicon and tungsten silicide (WSi) to a film thickness of 60 nm, respectively. As illustrated in FIG. 3, in the second scanning line 11b, a portion which extends along the Y direction by being overlapped with the channel region 1a' when planarly viewed functions as the gate electrode 3a, and the second scanning line includes a portion which goes in parallel to the first scanning line 11a from the portion which extends in the Y direction, and extends in the X direction.

In the second scanning line 11b, the gate electrode 3a which is integrally formed with the second scanning line is insulated by the semiconductor film 1a and a gate insulating film 2. According to the embodiment, as illustrated in FIGS. 3 and 4, in the base insulating film 12, a contact hole 810 is open on the side of the semiconductor film 1a. The gate electrode 3a is continuously formed even in the contact hole 810 and is electrically connected to the first scanning line 11a.

In FIG. 4, an interlayer insulating film 41 which performs interlayer insulation between the second layer and a third layer is provided on a layer side which is higher than the TFT 30. The interlayer insulating film 41 is formed, for example, using a TEOS film with a film thickness of 300 nm. On the interlayer insulating film 41, the contact hole 83 for electrically connecting the source-drain region 1e on the pixel electrode side and a lower-part capacitive electrode 71 of the storage capacitor 70 is open. In addition, a contact hole 81 for electrically connecting the source-drain region 1d on the data line side and the data line 6a is also open.

On the third layer which is higher than the interlayer insulating film 41, the lower-part capacitive electrode 71 and the storage capacitor 70 which includes an upper-part capacitive electrode 60a facing the lower-part capacitive electrode 71 through a dielectric film 75 are formed. The storage capacitor 70 is arranged so as to overhang near the center of the pixel electrode 9 in order to make capacitance large.

The upper-part capacitive electrode 60a is integrally formed with the capacitance line 60. The capacitance line 60 has a three-layer structure which is formed by interposing an aluminum (Al) film with a film thickness of 150 nm between titanium nitride (TiN) films with a film thickness of 50 nm, and 100 nm, respectively. A detailed configuration of the capacitance line 60 is not shown, however, the capacitance line is extended around the display area E in which the pixel electrode 9 is arranged, is electrically connected to a constant potential source, and is maintained to a fixed potential. In FIG. 3, on the semiconductor film 1a, the capacitance line 60 includes a portion which extends along the Y direction and a portion which extends along the X direction from the portion so as to be overlapped with the LDD region 1b on the data line side, LDD region 1c on the pixel electrode side, and the source-drain region 1e on the pixel electrode side, and a region which is overlapped with the lower-part capacitive electrode 71 becomes the upper-part capacitive electrode 60a. Accordingly, the upper-part capacitive electrode 60a functions as a fixed potential side capacitive electrode which is maintained to a fixed potential.

The lower-part capacitive electrode 71 is formed of, for example, conductive polysilicon with a film thickness of 100 nm. In FIG. 3, the lower-part capacitive electrode 71 includes a portion which extends so as to be overlapped with the upper-part capacitive electrode 60a in the Y direction and the X direction, respectively. In addition, the lower-part capacitive electrode overlaps with the source-drain region 1e on the pixel electrode side in a portion which extends in the Y direction and is electrically connected thereto through the contact hole 83. In addition, the lower-part capacitive electrode is electrically connected to a relay layer 93 on a fourth layer through a contact hole 84 in the portion which extends in the X direction. The relay layer 93 is electrically connected to a relay layer 67 on a fifth layer through a contact hole 85. In addition, the relay layer 67 is electrically connected to the pixel electrode 9 through a contact hole 86. Accordingly, the lower-part capacitive electrode 71 functions as a pixel potential side capacitive electrode which is maintained to a pixel potential.

The dielectric film 75 has a two-layer structure in which, for example, an HTO film with a film thickness of 4 nm and a silicon nitride (SiN) film with a film thickness of 15 nm are laminated.

In FIG. 4, an interlayer insulating film 42 which performs interlayer insulation between the third layer and the fourth layer is formed on a layer side which is higher than the storage capacitor 70 using, for example, a TEOS film with a film thickness of 400 nm. The contact hole 84 passes through the interlayer insulating film 42, is open so as to reach the surface of the lower-part capacitive electrode 71, and the contact hole 81 passes through the interlayer insulating films 42 and 41, and a gate insulating film 2, and is open, and then reaches the surface of the semiconductor film 1a.

In FIGS. 3 and 4, the data line 6a and the relay layer 93 are provided on the fourth layer. In FIG. 4, the data line 6a is electrically connected to the source-drain region 1d on the data line side of the semiconductor film 1a through the contact hole 81. In addition, the relay layer 93 is electrically connected to the lower-part capacitive electrode 71 through the contact hole 84. The data line 6a and the relay layer 93 have a four-layer structure in which, for example, a titanium (Ti) film with a film thickness of 20 nm, a TiN film with a film thickness of 50 nm, an Al film with a film thickness of 350 nm, and a TiN film with a film thickness of 150 nm are laminated in this order.

In addition, in a region corresponding to the contact hole 84, the upper-part capacitive electrode 60a and the dielectric film 75 are eliminated (open) using etching, and the relay layer 93 and the upper-part capacitive electrode 60a are set so as not to be short-circuited.

In FIG. 4, an interlayer insulating film 43 which performs interlayer insulation between the fourth layer and a fifth layer is formed on a layer side which is higher than the data line 6a and the relay layer 93 using, for example, a TEOS film with a film thickness of 600 nm. The contact hole 85 passes through the interlayer insulating film 43, is open, and reaches the surface of the relay layer 93. In addition, preferably, the surface of the interlayer insulating film 43 is subject to a planarizing process using, for example, a Chemical Mechanical Polishing (CMP) method or the like.

A shield layer 65 and a relay layer 67 are provided on the fifth layer. In FIG. 3, the shield layer 65 is provided so as to extend along the same direction as the data line 6a, that is, the Y direction. In the semiconductor film 1a, the data line 6a and the shield layer 65 are wired in a region facing the channel region 1a', the LDD region 1b on the data line side, the LDD region 1c on the pixel electrode side, the source-drain region 1d on the data line side, and the source-drain region 1e on the pixel electrode side. Accordingly, light which proceeds to the semiconductor film 1a from the upper layer side can be shielded by the data line 6a and the shield layer 65.

In addition, in FIG. 4, the relay layer 67 is preferably formed using the same film as the shield layer 65, is electrically connected to the pixel electrode 9 as described above, and relays an electrical connection between the pixel electrode 9 and the relay layer 93. The shield layer 65 and the relay layer 67 have a two-layer structure in which, for example, an Al film with a film thickness of 350 nm and a TiN film with a film thickness of 150 nm are laminated.

In FIG. 4, an interlayer insulating film 44 which performs interlayer insulation between the fifth layer and a sixth layer is formed on a layer side which is higher than the shield layer 65 and the relay layer 67 in a two-layer structure using, for example, a TEOS film with a film thickness of 600 nm and a Boron Silicate Glass (BSG) film with a film thickness of 75 nm. A contact hole 86 passes through the interlayer insulating film 44, is open, and reaches the surface of the relay layer 67. The interlayer insulating film 44 is subject to a planarizing process so as to have a planar surface.

In FIGS. 3 and 4, the pixel electrode 9 is formed on the sixth layer. As illustrated in FIG. 4, the pixel electrode 9 is electrically connected to the source-drain region 1e on the pixel electrode side of the semiconductor film 1a while being relayed through the contact holes 83, 84, 85, and 86 by the relay layers 67 and 93 as well as the lower-part capacitive electrode 71.

In addition, the interlayer insulating film 44 is an example of the "first insulating film" according to the embodiment of the invention, the contact hole 86 is an example of the "contact hole" according to the embodiment of the invention, and the pixel electrode 9 is an example of a "reflective pixel electrode" according to the embodiment of the invention.

A planar shape of the contact hole 86 among the contact holes 83, 84, 85, and 86 which are provided so as to connect the pixel electrode 9 and the source-drain region 1e on the pixel electrode side is a rectangular shape which is surrounded with a short side and a long side as illustrated in FIG. 3, and planar shapes of the contact holes 83, 84, 85 (hereinafter, referred to as other contact holes) are squares. In the contact hole 86, the length of the short side is approximately 0.5 µm, and the length of the long side is approximately 1 µm. The length on one side of other contact holes is approximately 0.7 µm. Accordingly, an opening area (contact area) of the contact hole 86, and opening areas of other contact holes are approximately the same.

According to the embodiment, the shape of the side which configures the rectangular contact hole 86 is a straight line, however, the contact hole may have a curved region. The rectangular contact hole 86 may have a shape which is similar to a rectangular shape surrounded with, for example, a curved short side and a straight long side. In addition, the contact hole 86 may have an oval shape which is surrounded with a curved short side and a curved long side. In addition, the contact hole may have an oval shape which is inflated near a center of the long side, and an oval shape which is recessed near the center of the long side. In short, the sides configuring the contact hole 86 include a side in the short side direction (lateral) and a side in the long side direction (longitudinal), and the contact hole 86 may have a region in which the lateral direction becomes shorter than the longitudinal direction which is orthogonal to the lateral direction at the apex of the contact hole.

The "approximately rectangular shape" according to the embodiment of the invention also includes a shape which is similar to a rectangular shape surrounded with a curved short side and a straight long side, or the like, in addition to a so-called rectangular shape which is surrounded with a straight short side and a straight long side. In addition, the "approximately oval shape" according to the embodiment of the invention also includes a shape which is similar to an oval which is surrounded with a curved short side and a curved long side and is inflated near the center, a hand drum shape which is surrounded with a curved short side and a curved long side, and is recessed near the center, or the like, in addition to a so-called oval shape which is surrounded with curved lines and is inflated near the center. In short, the "approximately rectangular shape" and the "approximately oval shape" mean a state in which: any one of an opening dimension of the contact hole 86 in the X direction or an opening dimension of the contact hole 86 in the Y direction becomes short in FIG. 3; and the side of the contact hole 86 may be a curved line, or, further, may be a straight line and a curved which are mixed therein, when viewed in the Z direction.

In the process of forming the contact hole 86, the contact hole 86 is arranged at a position at which the contact hole is not overlapped with the storage capacitor 70 planarly, that is, approximately the center of the pixel P (pixel electrode 9) in order to suppress a chance for damage to the storage capacitor 70. In addition, the contact hole 86 may be arranged so as to be overlapped with the pixel electrode 9 and the relay layer 67 planarly, for example, may be arranged at the peripheral edge portion of the pixel electrode 9. The longitudinal direction of the contact hole 86 is provided in a direction which intersects the extended direction of the relay layer 67.

In FIG. 4, the pixel electrode 9 is formed by covering the contact hole 86, and a concave portion 90 is formed at a position corresponding to the contact hole 86. In addition, the dielectric layer 46 is formed by covering the concave portion 90, and a concave portion 91 is formed at a position corresponding to the concave portion 90. In addition, the dielectric layer 46 is an example of a "dielectric multilayer film" according to the embodiment of the invention, and detailed descriptions will be made later.

An insulating film 47 and the alignment film 18 are laminated in this order on the surface side of the dielectric layer 46. As described above, the alignment film 18 is an oblique deposition film of an inorganic material (inorganic alignment film) such as silicon oxide or the like. The insulating film 47 is a base film with respect to the alignment film 18 and takes a role of setting a work function on the pixel electrode 9 side and a work function of the counter electrode 21 side to be approximately the same. In addition, the insulating film 47 also functions as a planarizing film which covers (encloses) an opening portion of the concave portion 91 which is formed in the dielectric layer 46, and a cavity 95 which is enclosed by the dielectric layer 46 is formed at a position corresponding to the concave portion 91. The insulating film 47 is an example of the "second insulating film" according to the embodiment of the invention and is formed of, for example, a silicon oxide film or the like.

Hereinafter, a region in which the contact hole 86 including the cavity 95 is referred to as a pixel contact region.

Outline of Pixel Contact Region

Figure 5:
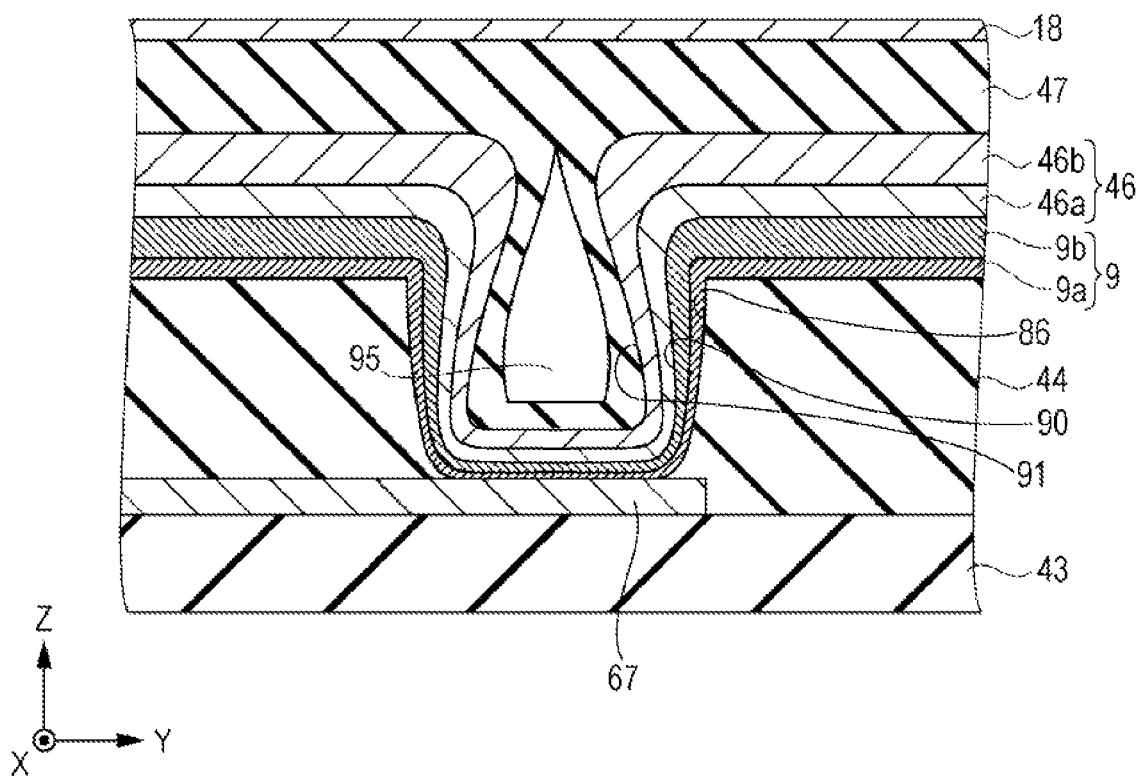
FIG. 5 is a schematic cross-sectional view which illustrates a region V (pixel contact area) which is surrounded with a dotted line in FIG. 4.

FIG. 5 is a schematic cross-sectional view corresponding to a region V which is surrounded with a dotted line in FIG. 4, that is, a schematic cross-sectional view which illustrates a state of the pixel contact region. FIG. 5 illustrates a schematic cross-sectional view in which the contact hole 86 goes along the lateral direction (Y direction). Hereinafter, an outline of the pixel contact region will be described with reference to FIG. 5.

In FIG. 5, the interlayer insulating film 44 is arranged above the TFT 30, and the contact hole 86 is formed.

The pixel electrode 9 covers a part of the surface of the interlayer insulating film 44, the base of the contact hole 86 (surface of relay layer 67), and a side wall and includes the concave portion 90 at a position corresponding to the contact hole 86. A film thickness of the pixel electrode 9 which covers the side wall of the contact hole 86 becomes large in a direction which goes toward the surface of the interlayer insulating film 44 from the base of the contact hole 86, that is, in the Z direction. A top face of the pixel electrode 9 has reflectivity and is configured by: a first conductive film 9a which is arranged by being in contact with the interlayer insulating film 44 and is formed of titanium; and a second conductive film 9b which is arranged by being in contact with the first conductive film 9a and is formed of aluminum. A migration of the aluminum which forms the second conductive film 9b is suppressed by the titanium which forms the first conductive film 9a, and accordingly, it is possible to improve flatness of the pixel electrode 9.

The dielectric layer 46 is arranged by covering the surface of the pixel electrode 9 which is formed on the interlayer insulating film 44 as well as a base and a side wall of the concave portion 90 of the pixel electrode 9 between the pixel electrode 9 and the insulating film 47 and includes the concave portion 91 at a position corresponding to the concave portion 90 of the pixel electrode 9. The film thickness of the dielectric layer 46 which covers the side wall of the concave portion 90 becomes large in a direction which goes toward the surface of the pixel electrode 9 from the base of the concave portion 90, that is, in the Z direction.

The dielectric layer 46 is a dielectric multilayer film in which a dielectric film with low reflectivity (first dielectric film 46a) and a dielectric film with high reflectivity (second dielectric film 46b) are laminated. The dielectric layer 46 is formed above the pixel electrode 9, is an enhanced reflective film which improves brightness of reflected light of the pixel electrode 9, and can provide a display which is brighter.

Specifically, the dielectric layer 46 is configured by the first dielectric film 46a which is formed by being in contact with the pixel electrode 9 and the second dielectric film 46b which is formed by being in contact with the first dielectric film 46a. It is possible to use, for example, magnesium fluoride (refractivity=1.38), silicon oxide (refractivity=1.46), or the like in the first dielectric film 46a. The second dielectric film 46b is a dielectric film with higher refractivity than that in the first dielectric film 46a, and for example, it is possible to use, for example, silicon nitride (refractivity=2.05), tantalum oxide (refractivity=2.10), or the like, therein. Each optical film thickness nd (n=refractivity, d=film thickness) of the first dielectric film 46a (low refractivity layer) and the second dielectric film 46b (high refractivity layer) which are formed on the pixel electrode 9 is set to one-fourth times, three-fourth times, . . . of $\lambda_0$ which is a wavelength at the time of designing.

Method of Manufacturing Liquid Crystal Device

Subsequently, a method of manufacturing a liquid crystal device 100 relating to the pixel contact region (region V in FIG. 4) which is a characteristic portion of the embodiment of the invention will be described. In addition, for the method of manufacturing the liquid crystal device 100 excluding the pixel contact region, a well-known technology is used, and descriptions thereof will be omitted.

Figure 6:
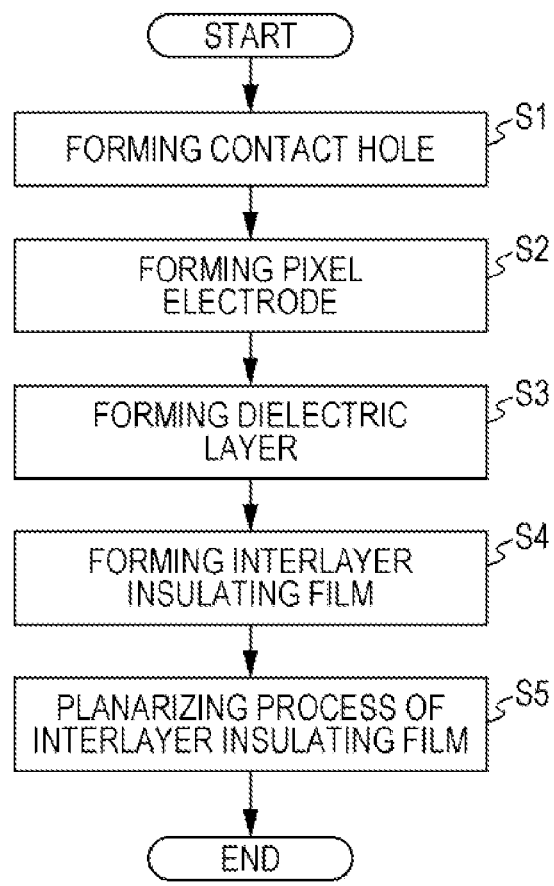
FIG. 6 is a process flowchart for forming a pixel contact area.

FIG. 6 is a process flow for forming the pixel contact region. FIGS. 7A to 7E correspond to the region V in FIG. 4 and illustrate a state of the pixel contact region after being subject to each process illustrated in FIG. 6.

FIGS. 8A and 8B are schematic diagrams which illustrate a relationship between an input direction (incoming direction) of deposits and a deposition state of the deposits in step S2 in FIG. 6. FIG. 8A is a diagram which illustrates a deposition state when deposits are input in an oblique direction, and FIG. 8B is a diagram which illustrates a deposition state when the deposits are input from right above.

First, an outline of the method of manufacturing the liquid crystal device in the pixel contact region with reference to FIGS. 6 and 7A to 7E.

In step S1 in FIG. 6, the interlayer insulating film 44 is etched using a well-known technology, for example, dry etching, and the rectangular contact hole 86 which penetrates the interlayer insulating film 44 is formed. As described above, the contact hole 86 is formed so as to have a planar shape which is either approximately rectangular or approximately oval.

FIG. 7A illustrates a state after step S1, and the mark L1 in the figure denotes an opening dimension at an apex of the contact hole 86 (length in Y direction). As described above, the L1 is approximately 0.5 nm. In addition, the depth of the contact hole 86 (length in Z direction) is approximately 0.7 nm.

In step S2 in FIG. 6, a reflective conductive film is formed so as to cover the surface of the interlayer insulating film 44 and the side wall and the base of the contact hole 86, the conductive film is patterned using a well-known technology, and the pixel electrode 9 is formed. More specifically, the first conductive film 9a which is formed of titanium with a film thickness of approximately 50 nm, and a second conductive film 9b which is formed of aluminum with a film thickness of approximately 150 nm which is thicker than the first conductive film 9a are continuously formed using a sputtering method and are patterned using a well-known technology (dry etching), and the pixel electrode 9 is formed.

FIG. 7B illustrates a state after step S2, and the mark L2 in the figure denotes an opening dimension (length in Y direction) at an apex of the concave portion 90 (smallest portion in opening dimension). Since the film thickness of the pixel electrode 9 (first conductive film 9a, second conductive film 9b) which covers the contact hole 86 is sufficiently small compared to the dimension of the contact hole 86, the concave portion 90 is formed at a position corresponding to the contact hole 86 in the pixel electrode 9. The concave portion 90 reflects the shape of the contact hole 86, and is formed so as to have a planar shape which is either approximately rectangular or approximately oval. In addition, the film thickness of the pixel electrode 9 which covers the side wall of the contact hole 86 is formed so as to become large in a direction going toward a top face (front surface) of the interlayer insulating film 44 from the base of the contact hole 86, that is, in the Z direction. For this reason, the film thickness of the pixel electrode 9 which covers the side wall of the contact hole 86 becomes a maximum in the vicinity of the apex of the contact hole 86, and an overhang (thick film region) of the pixel electrode 9 is formed at the apex of the concave portion 90. According to the embodiment, a portion at which a diameter of the concave portion 90 becomes a minimum is the upper part of the top face of the interlayer insulating film 44 and is the lower part of the uppermost surface of the pixel electrode 9. In addition, the film thickness of the pixel electrode 9 becomes larger toward the upper part at a portion covering at least the side wall of the contact hole 86. As a result, the opening dimension L2 of the apex of the concave portion 90 becomes smaller than the opening dimension L1 of the contact hole 86.

In step S3 in FIG. 6, the dielectric layer 46 is formed by covering the top face of the pixel electrode 9, and the base and the side wall of the concave portion 90. As described above, the dielectric layer 46 is configured by the first dielectric film 46a, and a dielectric film with higher refractivity than that of the first dielectric film 46a (second dielectric film 46b). Specifically, the first dielectric film 46a is formed of silicon oxide, the second dielectric film 46b is formed of silicon nitride, and the first and second dielectric films are formed using a Plasma enhanced Chemical Vapor Deposition (P-CVD) method. In addition, according to the embodiment, the film thickness of the dielectric layer 46 is approximately 150 nm.

FIG. 7C illustrates a state after step S3, and the mark L3 in the figure denotes an opening dimension (length in Y direction) at an apex of the concave portion 91. Since a film thickness of the dielectric layer 46 which covers the concave portion 90 is sufficiently small compared to a dimension of the concave portion 90, the concave portion 91 is formed at a position corresponding to the concave portion 90. The concave portion 91 reflects a shape of the concave portion 90, and is formed so as to have a planar shape which is either approximately rectangular or approximately oval. In addition, the film thickness of the dielectric layer 46 (film thickness with respect to side wall of concave portion 91) is formed so as to become large in the direction going toward the surface of the pixel electrode 9 from the base of the concave portion 90, that is, in the Z direction. For this reason, the film thickness of the dielectric layer 46 which covers the side wall of the concave portion 90 becomes a maximum in the vicinity of the apex of the concave portion 90, and an overhang (thick film region) of the dielectric layer 46 is formed at the apex of the concave portion 91. As a result, the opening dimension L3 of the concave portion 91 becomes smaller than the opening dimension L2 of the concave portion 90.

In step S4 in FIG. 6, silicon oxide as the insulating film 47 is deposited on the dielectric layer 46. The silicon oxide is formed using the P-CVD method, and a film thickness thereof is approximately 1 μm.

FIG. 7D illustrates a state after step S4. The insulating film 47 is formed by covering the surface of the dielectric layer 46, and the base and the side wall of the concave portion 91. The insulating film 47 grows so as to overhang in the Y direction in the vicinity of the apex of the concave portion 91, and an opening portion of the apex of the concave portion 91 is enclosed. As a result, the cavity 95 of which at least a part is located in the concave portion 91 is formed in the insulating film 47. At this time, the cavity 95 has a shape which is inflated in the vicinity of a center of the opening portion of the apex of the concave portion 91 and has a sharp end portion (apex) in the Z direction.

In the Z direction, a position of the apex of the cavity 95 is formed at a position which is higher than the top face of the pixel electrode 9 which is formed on the top face of the interlayer insulating film 44. In the figure, the height of the apex (length in Z direction) of the cavity 95 which protrudes in the Z direction from the surface of the pixel electrode 9 is denoted by the mark L4. As described above, a thick film region in which the pixel electrode 9 and the dielectric layer 46 overhang in the Y direction is formed at the apex of the concave portion 91, the opening dimension L3 of the apex of the concave portion 91 becomes smaller than the opening dimension L1 of the apex of the contact hole 86, and the opening portion of the apex of the concave portion 91 becomes easy to be covered with the insulating film 47. The height L4 of the apex of the cavity 95 depends on the opening dimension L3 of the apex of the concave portion 91, and when the opening dimension L3 becomes small, the height L4 of the cavity 95 becomes small. According to the embodiment, the height L4 of the apex of the cavity 95 is set to approximately 100 nm to 200 nm.

In addition, when setting the contact hole 86 to have the same planar shape as that in other contact holes (contact holes 83, 84, and 85) (square), that is, when making the opening dimension of the apex of the contact hole 86 large from 0.5 μm to 1 μm and setting the opening dimension L3 of the apex of the concave portion 91 which is formed at a position corresponding to the contact hole 86 to a length of two times of that in the embodiment, the height L4 of the apex of the cavity 95 becomes approximately 300 nm to 400 nm. That is, it is possible to make the height L4 of the apex of the cavity 95 low compared to the case in which the planar shape of the contact hole 86 is square by making the planar shape of the contact hole 86 approximately rectangular or approximately oval and making the opening dimension L3 of the apex of the concave portion 91 which is formed at a position corresponding to the contact hole 86 small.

In step S5 in FIG. 6, a planarizing process is performed with respect to the insulating film 47. The planarizing process is configured by a polishing process, and an etching process in which the film is reduced in thickness by being etched from the polished surface (reducing film thickness). Specifically, in the polishing process, a planarization (reducing film thickness) of the insulating film 47 using Chemical Mechanical Polishing (CMP) is performed. In the CMP, it is possible to obtain a planar polished surface at high speed due to a balance between a chemical operation of chemical components included in polishing liquid and a mechanical operation due to a relative movement of a polishing agent and the polished surface. Specifically, in the CMP, the polishing is performed while relatively rotating both a surface plate to which a polishing cloth (pad) which is formed of a non-woven fabric, polyurethane foam, a porous fluoric resin, or the like is attached and a holder which holds the element substrate 10.

Since the CMP is a method of mechanical polishing, a mechanical fluctuation occurs in a polishing amount, or scratches or the like occur on the polished surface at any rate. For this reason, the etching process for planarizing the polished surface is performed after performing the polishing process using the CMP. The etching process is a process for chemically reducing the film thickness of the polished surface of the insulating film 47, and it is possible to reduce minute scratches or the like which occur in the polishing process as well as to control a degree of reduced film thickness with high precision compared to the CMP in which the film thickness is mechanically reduced. For this reason, it is possible to accurately control the film thickness of the insulating film 47 which is formed on the pixel electrode 9 and to make the insulating film 47 thinner without exposing the cavity. According to the embodiment, an etching process using dry etching is performed with respect to the polished surface. The etching process may be performed using wet etching in addition to the dry etching.

FIG. 7E illustrates a state after performing the planarizing process. Since a display defect such as an irregular alignment may occur when the cavity 95 is exposed in the planarizing process, the planarizing process (process of reducing film thickness) is performed with respect to the insulating film 47 so that the cavity 95 of the insulating film 47 is not exposed. As described above, since the height L4 of the apex of the cavity 95 is lowered, it is possible to make the insulating film 47 thinner using the planarizing process and to make the film thickness of the insulating layer (dielectric layer 46, insulating film 47) which is laminated on the pixel electrode 9 smaller. As a result, since decreasing in an effective voltage which is applied to the liquid crystal layer 50 between the pixel electrode 9 and the counter electrode 21 becomes small, it is possible to provide a display of higher quality.

Subsequently, characteristics according to the embodiment of the invention, that is, a method of manufacturing in which the pixel electrode 9 is formed so that the film thickness of the pixel electrode 9 which covers the side wall of the contact hole 86 becomes large in the direction which goes toward the surface of the interlayer insulating film 44 from the base of the contact hole 86, that is, in the Z direction will be described with reference to FIGS. 8A and 8B.

Arrows in FIGS. 8A and 8B denote input directions of deposits. In addition, the element substrate 10 is rotated, and the deposits are assumed to be input from the input direction which is denoted by the arrow to the element substrate 10.

In FIG. 8A, the deposits are input (incoming) to the element substrate 10 from the oblique direction which is denoted by the arrow. Since there is not an obstacle which obstructs inputting of the deposits at the apex of the contact hole 86, the deposits are deposited at the same level as the surface of the interlayer insulating film 44. On the base of the contact hole 86, the side wall which is provided so as to surround the base thereof becomes an obstacle which obstructs inputting of the deposits, and the inputting (deposition) of deposits becomes difficult compared to the apex of the contact hole 86. On the side wall of the contact hole 86, similar to the base of the contact hole 86, the side wall of the contact hole 86 becomes an obstacle which obstructs inputting of the deposits, and the inputting (deposition) of deposits becomes difficult compared to the apex of the contact hole 86. In addition, an influence of the obstacle which obstructs the input of deposits becomes larger when being closer to the base of the contact hole 86, and it is difficult for the deposits to be deposited on the side wall of the contact hole 86. For this reason, on the side wall of the contact hole 86, the film thickness of the deposits becomes smaller when being closer to the base of the contact hole 86. That is, when causing the deposits to be input in the oblique direction with respect to the contact hole 86, the film thickness of the deposits (pixel electrode 9) which are deposited on the side wall of the contact hole 86 becomes large in the direction (Z direction) which goes toward the surface of the interlayer insulating film 44 from the base of the contact hole 86.

In FIG. 8B, since the deposits are input to the element substrate 10 from right above which is denoted by the arrow, there is not an obstacle which obstructs incoming of the deposits at the apex of the contact hole 86 and the base of the contact hole 86. Accordingly, the film thickness of the pixel electrode 9 which is deposited on the surface of the interlayer insulating film 44 and the film thickness of the pixel electrode 9 which is deposited on the base of the contact hole 86 are approximately the same. In the entire region on the side wall of the contact hole 86, the deposits are not easily deposited. For this reason, the film thickness of the deposits which are deposited on the side wall of the contact hole 86 (pixel electrode 9) becomes small compared to the case in which the deposits are obliquely input (FIG. 8A). The film thickness of the deposits which are deposited on the side wall of the contact hole 86 becomes approximately constant in the direction which goes toward the surface of the interlayer insulating film 44 from the base of the contact hole 86 (Z direction).

In step S2 in FIG. 6, the pixel electrode 9 is formed using a film forming method in which the deposits are input in the oblique direction. As the film forming method of the pixel electrode 9, it is preferable to adopt a film forming method in which an input direction of the deposits are controlled to a predetermined direction (oblique direction), however, it is not necessary to control all of the input directions of the deposits, and any method may be adopted if it is a film forming method including a component which is input in the oblique direction, and, for example, it is preferable to use a sputtering method.

In step S3 in FIG. 6, it is possible to form the dielectric layer 46 of which the film thickness becomes large in the direction which goes toward the surface of the pixel electrode 9 from the base of the concave portion 90, that is, in the Z direction using a film forming method in which deposits (reaction product) are input in the oblique direction, for example, a Chemical Vapor Deposition method in which material gas including silicon such as silane ($SiH_4$) or the like is caused to chemically react under a vapor phase and a reaction product such as silicon oxide, silicon nitride, or the like is deposited. As a film forming method of the dielectric layer 46, it is preferable to adopt a chemical vapor deposition method (P-CVD method) in which low-temperature deposition is possible using, for example, plasma energy.

As described above, it is possible to obtain the following effects using the liquid crystal device 100 according to the embodiment.

(1) The portion of the pixel electrode 9 which covers the side wall of the contact hole 86 is formed so that the film thickness becomes large toward the top face of the interlayer insulating film 44 from the base of the contact hole 86. In the pixel electrode 9, a portion which is formed on the top face of the contact hole 86 (edge portion of top face of interlayer insulating film 44) overhangs toward the center of the contact hole 86 rather than the portion which is formed on the side wall on the base side of the contact hole 86. Similarly, the dielectric layer 46 which covers the side wall of the concave portion 90 is formed so that the film thickness thereof becomes large in the direction which goes toward the surface of the pixel electrode 9 from the base of the concave portion 90 using the P-CVD method, and the thick film region of the dielectric layer 46 which overhangs in the Y direction is formed at the apex of the concave portion 90.

In the planar shape of the concave portion 91, the planar shape of the concave portion 90 (contact hole 86) is reflected, the shape becomes a rectangular shape which is surrounded by a short side and a long side, and a diameter of an opening in the short side direction is set to be smaller than a diameter of an opening in the longitudinal direction. A dimension of a region in which the opening dimension becomes small, that is, the opening dimension L3 at the apex of the concave portion 91 becomes smaller due to the thick film region, and it is possible to easily cover (enclose) the opening portion at the apex of the concave portion 91 using the insulating film 47.

The height L4 of the apex of the cavity 95 which is formed so that at least a part thereof is located in the concave portion 91 is changed in proportion to the opening dimension L3 at the apex of the concave portion 91. Since the opening dimension L3 at the apex of the concave portion 91 becomes small due to the thick film region and the planar shape (rectangular shape), it is possible to make the height L4 of the apex of the cavity 95 low.

The insulating film 47 is subject to a planarizing process (process of reducing film thickness) to an extent that the cavity 95 is not exposed and is thinned. Since the height L4 of the apex of the cavity 95 is set to be low, it is possible to make the insulating film 47 thinner and to make the film thickness of the insulating layer (dielectric layer 46, insulating film 47) which is laminated on the pixel electrode 9 smaller. As a result, lowering of the effective voltage which is applied to the liquid crystal layer 50 is reduced between the pixel electrode 9 and the counter electrode 21, and to provide a display of higher quality.

(2) The planarizing process which is performed in the insulating film 47 is configured by a polishing process in which the film thickness is mechanically reduced and an etching process in which the film thickness is chemically reduced. In the polishing process in which the film thickness is mechanically reduced, since minute scratches occur on the polished surface at any rate, it is possible to reduce scratches by etching the polished surface and to make a further planar surface.

(3) The pixel electrode 9 is covered with the dielectric layer 46 in which the first dielectric film 46a with low refractivity and the second dielectric film 46b with high refractivity are laminated. Since the dielectric layer 46 functions as the enhanced reflecting film which improves brightness of the reflected light of the pixel electrode 9, it is possible to provide a brighter display.

Electronic Apparatus

Figure 9:
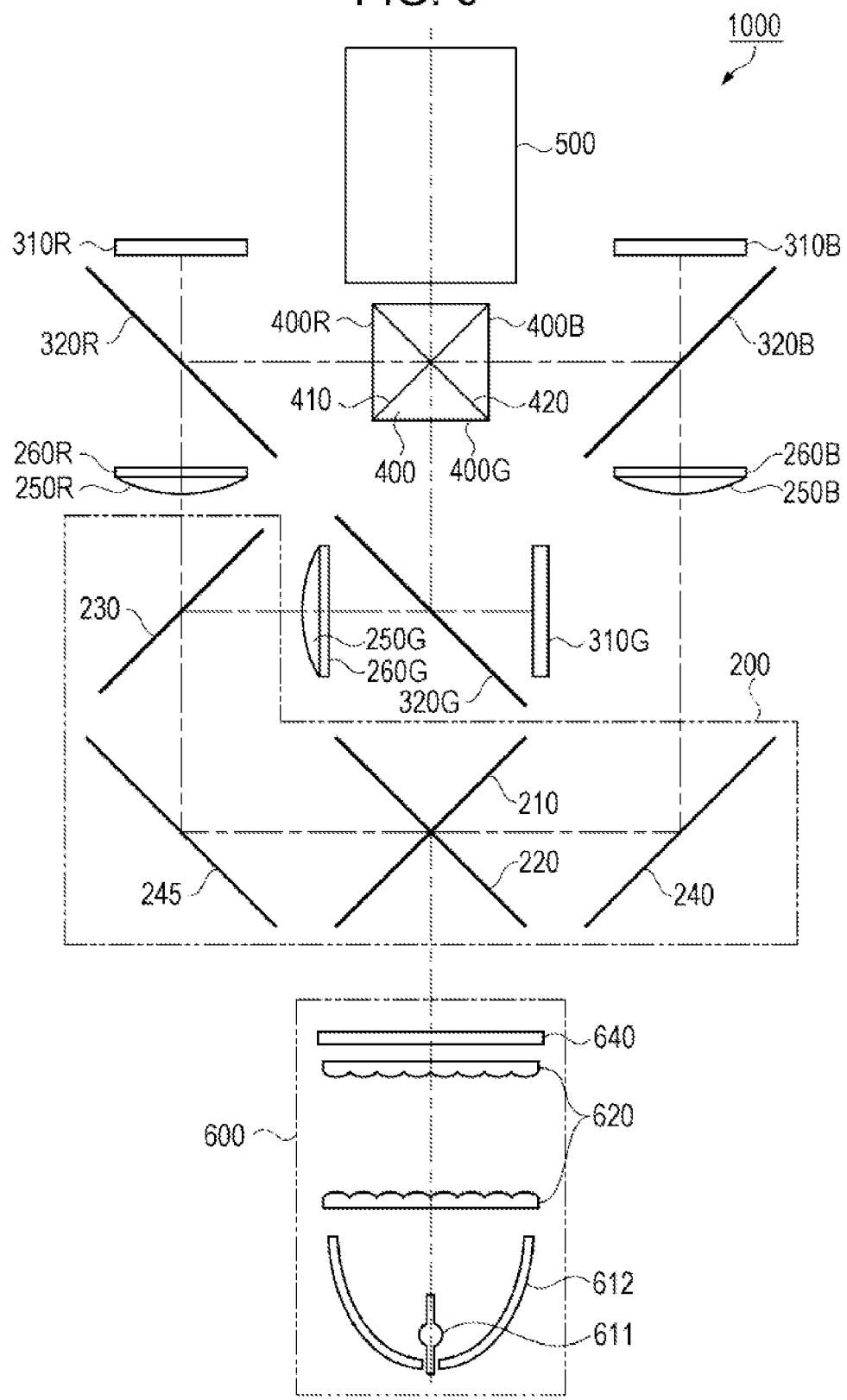
FIG. 9 is a plan view which illustrates a configuration of an optical system of a three panel-type projector as an electronic apparatus.

Subsequently, an example of an electronic apparatus on which the above described liquid crystal device according to the embodiment is mounted will be described with reference to FIG. 9. FIG. 9 is a plan view which illustrates a configuration of an optical system of a three panel-type projector (liquid crystal projector) as an electronic apparatus.

A projector 1000 according to the embodiment includes three reflection type optical modulation elements 310R, 310G, and 310B corresponding to red (R) light, green (G) light, and blue (B) light, respectively, forms image light by modulating a light flux which is emitted from a light source 611 according to image signals in each of the reflection type optical modulation elements 310R, 310G, and 310B and projects the image light to a screen or the like by enlarging thereof. The liquid crystal device 100 according to the above described embodiment is mounted on the reflection type optical modulation elements 310R, 310G, and 310B.

The projector 1000 includes an illumination optical system 600, a color separation optical system 200, parallel lenses 250R, 250G, and 250B, phase difference plates 260R, 260G, and 260B, polarization beam splitter 320R, 320G, and 320B, reflection type optical modulation elements 310R, 310G, and 310B, a cross dichroic prism 400 as a photosynthesis unit, and a projection optical unit 500.

The illumination optical system 600 includes a light source 611 which is configured by an extra-high pressure mercury lamp, a reflector 612 which is configured by a parabolic mirror, a lens array 620, a polarization conversion element 640, and the like. A parabolic light flux which is emitted from the light source 611 becomes a plurality of partial light fluxes in the reflector 612 and the lens array 620 and is emitted to the color separation optical system 200 as S polarization light due to the polarization conversion element 640.

The color separation optical system 200 has a function of dividing the light flux which is emitted from the illumination optical system 600 into three color light beams of R light, G light, and B light. In addition, the color separation optical system 200 includes a B light reflecting dichroic mirror 210, a RG light reflecting dichroic mirror 220, a G light reflecting dichroic mirror 230, and reflecting mirrors 240 and 245.

A B light component among the light flux which is emitted from the illumination optical system 600 is reflected by the B light reflecting dichroic mirror 210, is further reflected by the reflecting mirror 240, and reaches the parallel lens 250B. On the other hand, a R light component and G light component among the light flux which are emitted from the illumination optical system 600 are reflected by the RG light reflecting dichroic mirror 220, is further reflected by the reflecting mirror 245, and reaches the G light reflecting dichroic mirror 230. The G light component therein is reflected on the G light reflecting dichroic mirror 230 and reaches the parallel lens 250G, and the R light component penetrates the G light reflecting dichroic mirror 230 and reaches the parallel lens 250R.

The parallel lens 250R, 250G, and 250B convert the plurality of partial light fluxes which are emitted from the illumination optical system 600 into approximately parallel light fluxes and illuminate corresponding reflection type optical modulation elements 310R, 310G, and 310B. Respective color light beams (S polarization light) which penetrate the parallel lens 250R, 250G, and 250B are converted into P polarization light beams by the phase difference plates 260R, 260G, and 260B.

The polarization beam splitter 320G transmits the G light which is emitted from the phase difference plate 260G (P polarization light) and emits to the reflection type optical modulation element 310G. In addition, the polarization beam splitter 320G reflects the G light which is reflected on the reflection type optical modulation element 310G and modulated to the S polarization light and emits the light to the cross dichroic prism 400.

The polarization beam splitters 320R and 320B are also formed similarly to the polarization beam splitter 320G and have the same function. In addition, the polarization beam splitters 320R and 320B transmit the R light (P polarization light) and B light (P polarization light) which are emitted from the phase difference plates 260R and 260B, emit to the reflection type optical modulation elements 310R and 310B, respectively, and reflect the S polarization light beams in the R light and B light which are reflected on the reflection type optical modulation elements 310R and 310B and emit the light beams to the cross dichroic prism 400, respectively.

The cross dichroic prism 400 is formed as a prismatic shape having approximately square cross sections by bonding four prisms of a triangular pillar shape and is provided with dielectric multilayer films 410 and 420 along the bonding surface of a cross shape. The dielectric multilayer film 410 transmits the G light and reflects the R light. The dielectric multilayer film 420 transmits the G light and reflects the B light. In addition, the cross dichroic prism 400 receives modulation light beams of each color light which are emitted from the polarization beam splitters 320R, 320G, and 320B from input surfaces 400R, 400G, and 400B, respectively, and composes thereof, forms image light which expresses a color image, and emits thereof to the projection optical unit 500. The image light is projected by being enlarged, by the projection optical unit 500.

Since the liquid crystal device 100 according to the embodiment of the invention is applied to the projector 1000 according to the embodiment, it is possible to provide a display of high quality.

In addition, for the electronic apparatus, it is possible to apply the liquid crystal device 100 according to the embodiment of the invention to various electronic apparatuses such as a direct viewing-type television, a mobile phone, a mobile audio system, a personal computer, a monitor of a video camera, a car navigation device, an electronic organizer, a calculator, a work station, a television phone, a POS terminal, and a digital still camera, in addition to a projector.

The embodiment of the invention is not limited to the above described embodiment, and can be appropriately modified without departing from the scope or idea of the invention which are read in claims or in the entire specification, and an electro-optic device which is subject to such a modification, a method of manufacturing the electro-optic device, and an electronic apparatus to which the electro-optic device is applied are also included in the technical range of the invention. Various modification examples can be taken into consideration in addition to the above described embodiment. Hereinafter, a modification example will be described.

Modification Example 1

The embodiment of the invention is not limited to a reflection type liquid crystal device. For example, the embodiment can be applied to a transmission type liquid crystal device. In addition, the dielectric layer 46 may have a configuration in which transmissivity of the transmission type liquid crystal device is increased.

The dielectric layer 46 according to the embodiment of the invention is not essential, and a configuration may be adopted in which the dielectric layer 46 according to the embodiment is omitted and the contact hole 86 is covered with the pixel electrode 9. That is, it may be a configuration in which the dielectric layer 46 according to the embodiment is omitted and the side wall of the contact hole 86 is covered with the pixel electrode 9 which becomes thick toward the surface of the interlayer insulating film 44 (apex of contact hole 86) from the base of the contact hole 86.

In addition, the embodiment is not only applied to the liquid crystal device 100 and can also be applied to a light emitting device including an organic electroluminescence element. In this manner, it is possible to reduce irregular brightness due to a concave portion which is caused by the contact hole 86.

The entire disclosure of Japanese Patent Application No. 2012-240000, filed Oct. 31, 2012 is expressly incorporated by reference herein.

What is claimed is:

1. An electro-optic device comprising:
   a pixel switching element;
   a first insulating film which is arranged at an upper part of the pixel switching element and is formed with a contact hole;
   a pixel electrode which covers a part of a surface of the first insulating film, and a base and a side wall of the contact hole, includes a concave portion at a position corresponding to the contact hole, is electrically connected to the pixel switching element, and includes reflectivity;
   a second insulating film which covers the pixel electrode and includes a cavity at least part of which thereof is located inside the concave portion; and
   a dielectric multilayer film which covers a surface of the pixel electrode, and a base and a side wall of the concave portion of the pixel electrode between the pixel electrode and the second insulating film,
   wherein a planar shape of the contact hole is either an approximately rectangular shape or an approximately oval shape,
   a film thickness of the pixel electrode which covers the side wall of the contact hole becomes large toward the surface of the first insulating film from the base of the contact hole, and
   a film thickness of the dielectric multilayer film which covers the side wall of the concave portion becomes large toward the surface of the pixel electrode from the base of the concave portion.

2. An electronic apparatus comprising:
   the electro-optic device according to claim 1.

3. An electro-optic device comprising:
   a pixel switching element;
   a first insulating film which is arranged at an upper part of the pixel switching element and is formed with a contact hole;
   a pixel electrode which covers a part of a surface of the first insulating film, and a base and a side wall of the contact hole, includes a concave portion at a position corresponding to the contact hole, is electrically connected to the pixel switching element, and includes reflectivity; and
   a second insulating film which covers the pixel electrode and includes a cavity at least part of which thereof is located inside the concave portion,
   a dielectric multilayer film which covers a surface of the pixel electrode, and a base and a side wall of the concave portion of the pixel electrode between the pixel electrode and the second insulating film,
   wherein
   a planar shape of the contact hole is an approximately oval shape,
   a film thickness of the pixel electrode which covers the side wall of the contact hole becomes large toward the surface of the first insulating film from the base of the contact hole, and
   a film thickness of the dielectric multilayer film which covers the side wall of the concave portion becomes large toward the surface of the pixel electrode from the base of the concave portion.

4. An electronic apparatus comprising:
   the electro-optic device according to claim 3.

* * * * *